United States Patent
Gismervik (10) Patent No.: US 9,816,758 B2
(45) Date of Patent: Nov. 14, 2017

(54) INTEGRATED HEATER ASSEMBLY FOR A TANK, METHODS FOR INSTALLING AND MANUFACTURING SUCH AN ASSEMBLY AND A VEHICLE INLUDING SUCH A HEATER ASSEMBLY

(75) Inventor: Øystein Gismervik, Fyllinggadalen (NO)

(73) Assignee: Wema As, Laksevag (NO)

( * ) Notice: Subject to any disclaimer, the term of this patent is extended or adjusted under 35 U.S.C. 154(b) by 407 days.

(21) Appl. No.: 13/138,691

(22) PCT Filed: Mar. 16, 2010

(86) PCT No.: PCT/NO2010/000100
§ 371 (c)(1),
(2), (4) Date: Sep. 30, 2011

(87) PCT Pub. No.: WO2010/110669
PCT Pub. Date: Sep. 30, 2010

(65) Prior Publication Data
US 2012/0031082 A1    Feb. 9, 2012

(30) Foreign Application Priority Data
Mar. 18, 2009 (NO) .................................. 20091163

(51) Int. Cl.
*F01N 3/10* (2006.01)
*F28D 1/02* (2006.01)
*F01N 3/20* (2006.01)
*F01N 13/18* (2010.01)

(52) U.S. Cl.
CPC ......... *F28D 1/0213* (2013.01); *F01N 3/2066* (2013.01); *F01N 13/18* (2013.01);
(Continued)

(58) Field of Classification Search
CPC ............. F01N 2610/02; F01N 2610/10; F01N 2610/1406; F01N 2610/1413;
(Continued)

(56) References Cited

U.S. PATENT DOCUMENTS 4,726,346 A    2/1988 Lucht
9,151,736 B2 * 10/2015 Frivik ..................... F01N 3/208
(Continued)

FOREIGN PATENT DOCUMENTS

DE        199 35 920 A1      3/2001
DE      102006013263   *    9/2007
(Continued)

OTHER PUBLICATIONS

DE102006013263 machine English translation.*

*Primary Examiner* — Mark Laurenzi
*Assistant Examiner* — Jason Sheppard
(74) *Attorney, Agent, or Firm* — Francis C. Hand; Carella, Byrine, et al.

(57) ABSTRACT

An integrated heater assembly (190) is operable to provide a supply of solution from a tank (200). The assembly (190) includes a head arrangement (290) for mounting onto a hole of the tank (200), and a heating element (210) for selectively warming the solution in the tank (200), wherein the heating element (210) includes a duct through which fluid for heating the solution is operable to flow, and wherein the head arrangement (290) includes a valve (220) for controlling flow of the fluid within the duct. The valve (220) is optionally retained in a snap-fit manner within a plastics material moulding of the head arrangement (290). Moreover, the valve (220) is optionally an electromagnetic solenoid valve. The assembly (109) is beneficially adapted for coping with urea solution in the tank (200).

6 Claims, 4 Drawing Sheets

(52) U.S. Cl.
CPC ...... *F01N 2610/02* (2013.01); *F01N 2610/10* (2013.01); *F01N 2610/1406* (2013.01); *F01N 2610/148* (2013.01); *F01N 2610/1486* (2013.01); *Y02T 10/24* (2013.01); *Y10T 29/49826* (2015.01)

(58) Field of Classification Search
CPC ....... F01N 2610/142; F01N 2610/1486; F01N 2900/1818; F28D 1/0213
USPC ............................................ 432/209; 60/295
See application file for complete search history.

(56) References Cited

U.S. PATENT DOCUMENTS

| | | | |
|---|---|---|---|
| 2005/0207936 A1* | 9/2005 | Berryhill | B01D 53/9495 |
| | | | 422/63 |
| 2006/0213473 A1 | 9/2006 | Theorell | |
| 2007/0075467 A1 | 4/2007 | Osaku | |
| 2007/0079599 A1* | 4/2007 | Osaku et al. | 60/283 |
| 2007/0107779 A1* | 5/2007 | Brook et al. | 137/202 |
| 2010/0154907 A1* | 6/2010 | Lecea et al. | 137/565.29 |
| 2010/0162690 A1* | 7/2010 | Hosaka et al. | 60/295 |

FOREIGN PATENT DOCUMENTS

| | | |
|---|---|---|
| EP | 1 582 732 B1 | 12/2005 |
| EP | 1 662 103 A1 | 5/2006 |
| WO | WO 00/21881 | 4/2000 |
| WO | WO 2005/054638 | 6/2005 |
| WO | WO 2008/020194 | 2/2008 |

\* cited by examiner

INTEGRATED HEATER ASSEMBLY FOR A TANK, METHODS FOR INSTALLING AND MANUFACTURING SUCH AN ASSEMBLY AND A VEHICLE INLUDING SUCH A HEATER ASSEMBLY

FIELD OF THE INVENTION

The present invention relates to integrated heater assemblies for road vehicles, wherein the assemblies are operable to dispense urea solution (for example AdBlue) to exhaust treatment systems of such vehicles, the assemblies including both a heater arrangement and a valve arrangement. Moreover, the invention concerns methods of operating these integrated heater assemblies. Furthermore, the invention relates to vehicles including the integrated heater assemblies.

BACKGROUND OF THE INVENTION

Contemporary combustion engines operate by burning a mixture of a hydrocarbon fuel and air in one or more piston cylinders to generate mechanical work. The engines beneficially operate with combustion in the one or more cylinders occurring at a high combustion temperature for achieving more efficient engine operation. However, engine operation at high combustion temperatures has associated therewith generation of soot and nitrogen oxide exhaust products, for example nitrous oxides (NOx). Soot and nitrogen oxide exhaust products are hazardous materials when ejected into the environment. A contemporary approach is thus to treat such exhaust products in apparatus included in exhaust systems of combustion engines.

For reducing concentrations of exhaust pollutants to within limits defined by legislation, for example contemporary European legislation pertaining to exhaust emissions, vehicle manufacturers conventionally employ Selective Catalytic Reduction (SCR) and/or Exhaust Gas Recirculation (EGR) in their vehicles. SCR is effective for absorbing nitrous oxides whereas EGR ensures more complete oxidation of nitrogen oxides present in exhaust gases.

SCR operation is improved by using chemical agents which are transported on vehicles. For example, "AdBlue" is a trade name for a chemical agent corresponding substantially to aqueous urea solution 32.5%. This solution is injected into exhaust gases of modern diesel engines during a post-combustion process for treating engine exhaust gases for reducing a proportion of harmful nitrous oxide (NOx) present in these gases. AdBlue is only ever used in conjunction with an SCR. Moreover, vehicles which are equipped with an SCR will carry an AdBlue storage tank in addition to a fuel tank. In operation, AdBlue is transferred from the storage tank and injected under pressure into exhaust gases where a series of chemical reactions occur as outlined in Table 1 below.

Figure 1:
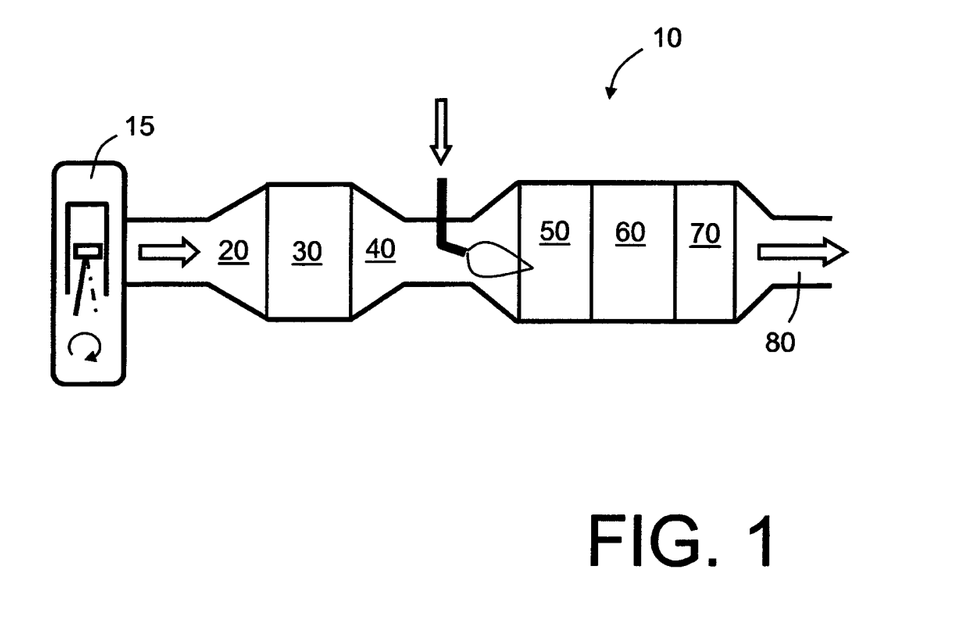
FIG. 1 is a schematic illustration of an exhaust system of a vehicle operable to employ AdBlue for reducing NOx concentrations in exhaust gases passing through the exhaust system.

In FIG. 1, an exhaust system for a combustion engine 15 is indicated generally by 10. The system 10 includes in sequence an inlet 20 for receiving combustion gases from the engine 15, an oxidation catalyst 30, an AdBlue injection region 40, a hydrolysis catalyst 50, an SCR catalyst 60, an oxidation catalyst 70 and finally an outlet 80.

TABLE 1

| Region | Reaction |
| --- | --- |
| Oxidation catalyst 30 | $2NO + O_2 = 2NO_2$ |
|  | $2CO + O_2 = 2CO_2$ |
|  | $4HC + 3O_2 = 2CO_2 + 2H_2O$ |

TABLE 1-continued

| Region | Reaction |
| --- | --- |
| Hydrolysis catalyst 50 | $CO(NH_2)_2 + H_2O = 2NH_3 + CO_2$ |
| SCR catalyst 60 | $8NH_3 + 6NO_2 + 7N_2 + 12H_2O$ |
|  | $4NH_3 + 4NO = O_2 + 4N_2 + 6H_2O$ |
|  | $2NH_3 + NO + NO_2 = 2N_2 + 3H_2O$ |
| Oxidation catalyst 70 | $4NH_3 + 3O_2 = 2N_2 + 6H_2O$ |

Essentially, the process occurring in the exhaust system 10 involves an AdBlue mixture being passed onto a superheated porous ceramic head of the SCR catalyst 60 whereat the de-ionised water evaporates and remaining urea of the injected AdBlue is passed on as a reagent which is operable to break nitrous oxide components (NOx) into mostly Nitrogen and water. Any contaminants present in the AdBlue will collect on the SCR catalyst 60, eventually causing it to clog and fail. It is therefore imperative that the AdBlue remains free from impurities through all stages of production, storage and dispensing.

Efficient AdBlue transfer relies on suitable equipment being installed onto vehicles. Failure of such equipment potentially results in premature product failure, or even worse a catastrophic event such as a complete SCR failure. AdBlue is very susceptible to contamination from both foreign matter and incorrect material selection. A main influence concerns the de-ionised water element of the solution which draws ions from materials which it comes into contact with; this changes the chemical composition of the AdBlue and causes salts to form which in turn clog the ceramic head on the SCR catalyst 60. Most common causes of premature failure of the SCR catalyst 60 are typically either a result of the ingress of damaged pump parts being accidentally transferred into the AdBlue tank or as a result of incorrect material selection. Inert materials should thus always be used to handle AdBlue.

The range of AdBlue transfer equipment on a vehicle must be reliable under diverse operating conditions in order to avoid costly damage occurring to an associated engine exhaust system of the vehicle. In particular, AdBlue must be delivered from an AdBlue storage tank of a vehicle to an exhaust system of the engine in a suitable ratio of urea to water. A problem in practice is that urea can freeze out of the AdBlue at low temperatures and result in blockage and a too dilute AdBlue being provided to the exhaust system. The present invention seeks to address this problem.

SUMMARY OF THE INVENTION

The present invention seeks to provide an assembly which is more reliably operable to provide urea solution to an exhaust treatment system of a vehicle.

According to a first aspect of the present invention, there is provided an integrated heater assembly for providing a supply of solution from a tank, characterized in that the assembly includes a head arrangement for mounting onto an access opening of the tank, and a heating element for selectively warming the solution in the tank, wherein the heating element includes a duct through which fluid for heating the solution is operable to flow, and wherein the head arrangement includes a valve for controlling flow of the fluid within the duct.

The invention is of advantage in that integration of the valve within the heater assembly is capable of improving reliability of urea supply as well as reducing manufacturing and installation costs.

Optionally, the integrated assembly further including at least one of:
(a) a temperature sensor for measuring a temperature of the solution within the tank;
(b) a depth sensor for measuring a depth of solution within the tank; and
(c) a concentration sensor for measuring a concentration of the solution within the tank.

Optionally, the assembly is adapted for coping with urea solution in the tank.

Optionally, the integrated assembly further comprises a pipe for extracting solution from a lower portion of the tank.

Optionally, in the integrated assembly, the heating element is implemented in at least one of:
(a) a spiral form;
(b) an "L-shape" form; and
(c) a combination of linear and curved portions of said heating element (200).

More optionally, the spiral form includes in a range of 2 to 20 spiral turns.

Optionally, in the integrated assembly, the valve is an electromagnetic solenoid valve.

Optionally, in the integrated assembly, the valve is retained in a snap-fit manner within a plastics material and/or rubber moulding of the head arrangement.

According to a second aspect of the invention, there is provided a method of installing an integrated assembly pursuant to the first aspect of the invention through an aperture in a tank, the method including steps of:
(a) offering a distal end of a heating element of the assembly to the aperture and inserting the distal end a distance into the aperture;
(b) rotating the assembly by an angle in conformity with an angled region of the heating element; and
(c) further inserting the heating element into the aperture until a proximate end of the heating element is included within the tank, so that a head arrangement coupled to the heating element at the proximate end makes a sealing abutment to the tank.

According to a third aspect of the invention, there is provided a method of manufacturing an integrated assembly pursuant to the first aspect of the invention, the method including:
(a) forming a head arrangement of the integrated assembly;
(b) installing a heating element onto the head arrangement;
(c) installing a valve onto the head arrangement for selectively controlling in operation a flow of heating fluid within the heating element.

Optionally, in the method includes, when forming the head arrangement, manufacturing operations including at least one of: rubber forming, plastics material injection moulding.

According to a fourth aspect of the invention, there is provided a vehicle including a combustion engine for propelling the vehicle, the combustion engine including an exhaust system for handling exhaust gases generated by the engine, the exhaust system including a urea-solution exhaust processing arrangement provided in operation with urea solution from a tank via an integrated assembly pursuant to the first aspect of the invention.

It will be appreciated that features of the invention are susceptible to being combined in any combination without departing from the scope of the invention.

DESCRIPTION OF THE DIAGRAMS

Embodiments of the present invention will now be described, by way of example only, with reference to the following diagrams wherein.

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Description of Embodiments of the Invention

Figure 2:
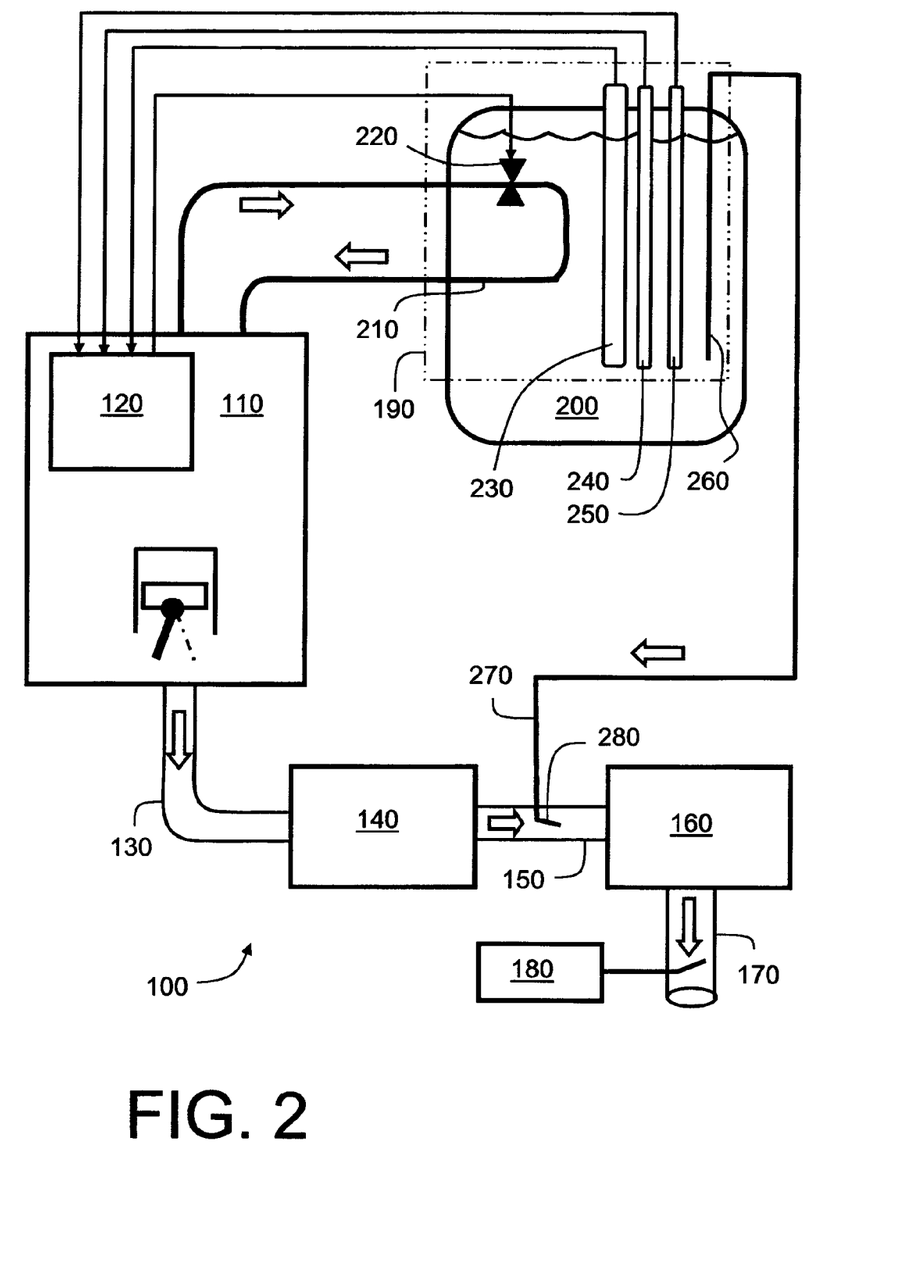
FIG. 2 is a schematic illustration of an engine system for a vehicle including an exhaust treatment system utilizing AdBlue, the treatment system being implemented pursuant to the present invention.

Referring to FIG. 2, there is shown an engine system for a vehicle; the engine system is indicated generally by 100. The engine system 100 includes an internal combustion engine 110 including an engine control module (ECM) 120; optionally, the combustion engine 110 is a diesel engine. An exhaust outlet 130 of the engine 110 is coupled via a particle filter 140 and subsequently via a decomposition pipe 150 to a selective catalytic reduction (SCR) module 160 whose final exhaust output to ambient atmosphere 170 is equipped with an NOx sensor 180. The NOx sensor 180 is employed in operation to monitor nitrous oxide (NOx) content of exhaust gases ejected to ambient atmosphere; beneficially, the sensor 180 is coupled in communication with the ECM 120 for controlling operating parameters of the engine 110, for example with regard to cylinder valve opening/closing times and fuel/air mixture concentration in one or more cylinders of the engine 110.

The system 100 further comprises an AdBlue tank 200 for storing a quantity of aqueous urea solution of substantially 32.5% concentration. The tank 200 is provided with a heater assembly 190 including a heating element 210 implemented as a tube for receiving cooling fluid from the engine 110, for example cooling water from the engine 110. Circulation of the cooling fluid through the tube of the heating element 210 is operable to warm the quantity of aqueous urea solution within the tank 200 to reduce a risk that its urea content freezes within the tank 200. The tube of the heating element 210 is provided with a valve 220 for controlling a flow of the cooling fluid within the heating element 210. The assembly 190 further includes a depth sensor 230 for measuring a quantity of aqueous urea solution remaining within the tank 200, and a temperature sensor 240 for measuring a temperature of the aqueous urea solution within the tank 200. The depth sensor 230 is beneficially implemented using a floating magnet operable to float at a liquid/air surface interface of aqueous urea solution included within the tank 200 whilst sliding along a hollow non-magnetic guiding tube, wherein a hollow interior of the guiding tube is provided with a series of magnetic reed switches therealong which are selectively switched by the floating magnet as the floating magnet is moved along the hollow tube to provide a measure depth of the aqueous urea solution present within the tank 200.

However, alternative implementations for the depth sensor 230 are possible, and beneficially include one or more of
(a) using one or more ultrasonic sensors;
(b) using one or more optical liquid-surface measurement sensors;
(c) using one or more pressure sensors disposed within the tank 200;
(d) using one or more capacitance sensors, each sensor including spatially-disposed electrodes within the tank 200 and being exposed to AdBlue as a capacitive dielectric for the sensor and/or to a dielectric float on the AdBlue within the tank 200.

Moreover, the assembly 190 further comprises a concentration sensor 250 for measuring a concentration of urea in the aqueous urea solution within the tank 200; the concentration sensor 250 is beneficially based upon measuring electrical conductivity or measuring differential ultrasonic radiation propagation within the aqueous solution within the tank 200. There is also included in the assembly 190 an AdBlue extraction pipe 260 for feeding AdBlue from the tank 200 via a hose 270 to an AdBlue dosing module 280 associated with the decomposition pipe 150. As will be elucidated in more detail later, the valve 220 is beneficially integrated into the assembly 190 together with the heating element 210, and optionally also with one or more of the depth sensor 230, the temperature sensor 240, the concentration sensor 250 and the extraction pipe 260.

Heat generated by the engine 110 in operation heats cooling fluid within the engine 110. At least a portion of this cooling fluid circulates via the heating element 210 to heat AdBlue within the tank 200; this heating ensures that the tank 200 is devoid of any frozen or solidified urea therein which could subsequently cause the AdBlue to be deficient in urea content when provided via the hose 260 to the dosing module 270 for injection into the decomposition pipe 150 to treat exhaust gases generated by the engine 110. The valve 220 is employed to hinder circulation of the cooling fluid within the heating element 210 when the AdBlue within the tank 200 is within a desired temperature range and/or above a given temperature threshold, for example as measured using the temperature sensor 240 within the tank 200; use of the valve 220 prevents overheating of the AdBlue within the tank 200, and also reduces unnecessary cooling of the engine 110 for enabling the engine 110 to function more optimally. The depth sensor 230 is employed to monitor a quantity of AdBlue included within the tank 200, for example with regard to raising an alarm in an event that the tank 200 needs to be refilled with AdBlue. Moreover, the AdBlue concentration sensor 250 is operable to measure a concentration of urea present in the AdBlue and therefore be used to control operation of the valve 220 to cause heating of the tank 200 in an event that the urea concentration in the AdBlue is too low as a consequence of freezing or solidifying of urea at lower temperatures within the tank 200. Beneficially, the valve 220, the depth sensor 230, the temperature sensor 240 and the concentration sensor 250 are coupled in operation in communication with the engine control module (ECM) 120; as aforementioned, the control module 120 is operable to control the valve 220 to maintain the AdBlue in the tank 200 in a suitable state for the engine 110 and to provide appropriate warnings to a driver of the vehicle when the tank 200 needs to be refilled and/or its AdBlue is of unsuitable composition. Optionally, the assembly 190 includes a bi-directional digital interface so that control signals for controlling the valve 220 as well as signals generated by the sensors 230, 240, 250 are communicated via the digital interface.

The temperature of the AdBlue entering the dosing module 280 is beneficially in a range of +5° C. to +70° C. Moreover, the engine control module (ECM) 120 is operable to control cooling fluid flow through the valve 220, for example to open the valve 220 when the temperature of AdBlue within the tank 200 falls below −5° C. so that cooling fluid from the engine 110 is able to heat AdBlue within the tank 200. Optionally, the engine control module 120 is beneficially operable to pulse the valve 200 with a duty cycle in a range between 0% and 100% to provide a degree of graduated heating when the AdBlue in the tank 200 has a temperature in a range of −5° C. to 0° C.; such operation enables the valve 220 to be implemented as an inexpensive robust electromagnetic ON/OFF solenoid valve whilst providing a degree of proportional heating control by controlling its ON/OFF duty cycle. The valve 220 is beneficially operable to control a flow rate therethrough in a range of 2 liters/minute to 10 liters/minute. Moreover, the valve 220 is beneficially designed to operate with coolant fluid temperatures in a range of −40° C. to +90° C. Furthermore, the valve 220 is beneficially designed to be able to operate at pressures up to 2.5 Bar relative to ambient pressure. When implemented as an electromagnetic valve, the valve 220 beneficially includes a solenoid coil operable when the valve 220 is in an ON state to be energized by a 12 volts supply at a supply current of 1.5 Amperes or less; however, other voltage and current ratings for the solenoid are also possible to utilize for implementing embodiments of the present invention.

Figure 3:
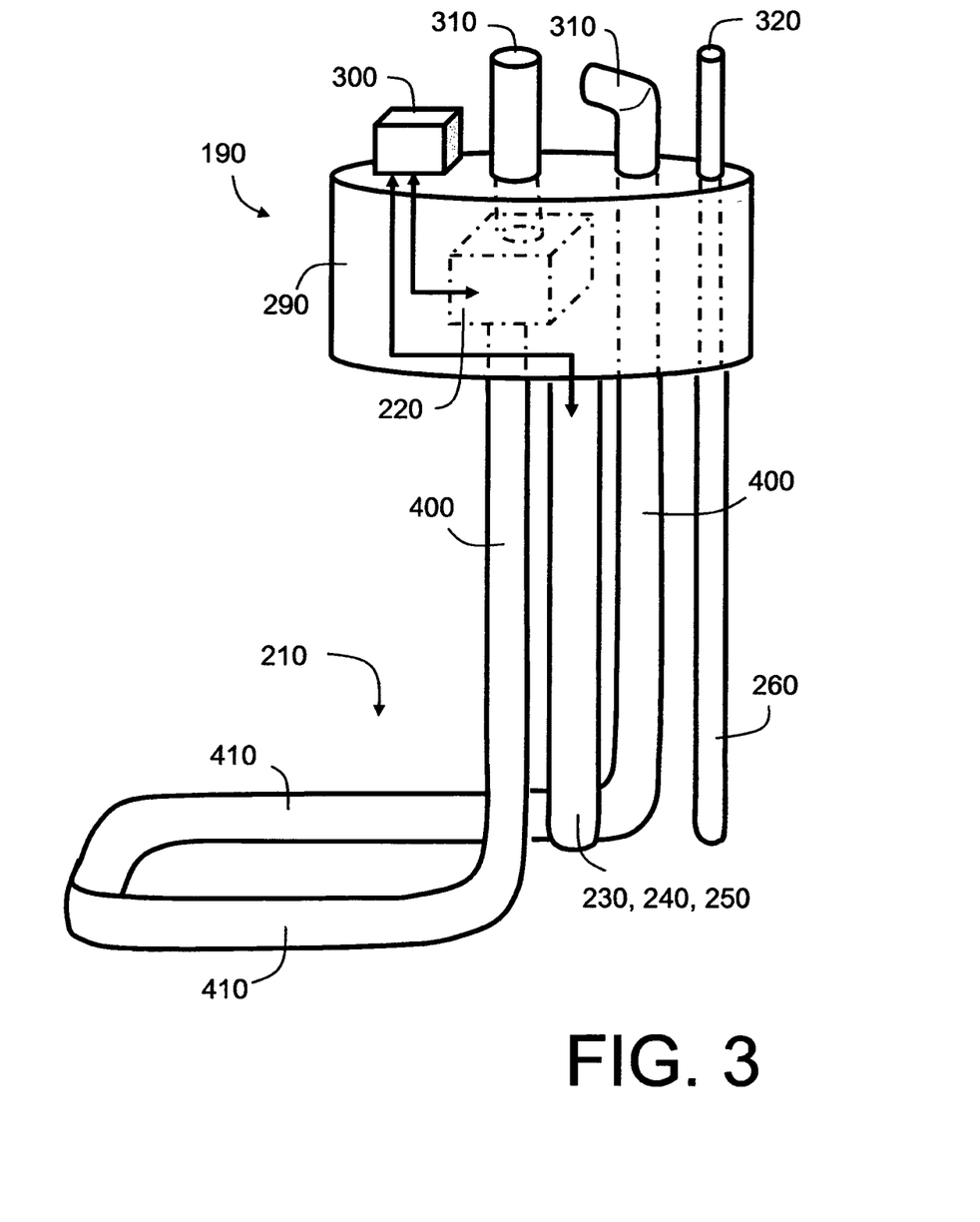
FIG. 3 is a schematic illustration of a first embodiment of a heater assembly pursuant to the present invention for utilizing in the exhaust system of FIG. 2.

Embodiments of the heater assembly 190 for inclusion within the tank 200 will now be described with reference to FIG. 3 and FIG. 4. In FIG. 3, the heater assembly 190 includes a head arrangement 290 for housing the valve 220 and for providing an anchorage for the heating element 210, for the sensors 230, 240, 250 and for the AdBlue extraction pipe 260. The head arrangement 290 is beneficially at least partially fabricated from one or more of: moulded rubber, injection-moulded plastics material, Moreover, the head arrangement 290 is advantageously provided with a peripheral flange (not shown) for receiving a fluid-tight seal for preventing unwanted escape of AdBlue from the tank 200 and for preventing contamination from entering into the tank 200 when the assembly 190 is installed onto the tank 200. The seal is beneficially implemented as a nitrile or silicone rubber gasket, although other types of sealing materials can be employed if required. The tank 200 is conveniently designed to receive the head arrangement 290 at an upper region of the tank 200 for reducing a risk of leakage of AdBlue at the seal. In practice, the assembly 190 is implemented so that the heating element 210 is more spatially extensive than the head arrangement 290 than presented in FIG. 3 consistent with the heating element 210 being capable of being inserted through the hole in the tank 200 during installation and the head arrangement 290 engaging onto a periphery of the hole to provide a seal.

Terminations for the connectors 300 and access pipes 310, 320 are either substantially normal to a surface plane of the head arrangement 290, or substantially parallel to the surface plane, or a combination of both as illustrated. Optionally, the head arrangement 290 is provided with flexible flying connectors for coupling to sockets mounted on the vehicle substantially adjacently to the tank 200. Optionally, the head arrangement 290 is implemented as a plastics material injection-moulded component wherein the connectors 300 and the access pipes 310, 320 are implemented as integral parts of the component. Optionally, the valve 220 is retained in a snap-fit manner within the component for facilitating rapid and efficient manufacture.

The heating element 210 is beneficially shaped in a generally "L"-shape configuration including two first sections 400 disposed substantially perpendicular to a plane of the head arrangement 290 and a second section 410 lying substantially parallel to a plane of the head arrangement 290, the second section 410 including a substantially 180° U-bend as illustrated. Such an implementation of the assembly 190 provides benefits in that the second section 410 engages into a lower portion of the tank 200 to provide effective warming of AdBlue therein whilst also allowing installation of the assembly 190 through a relative small mounting aperture or hole provided on the tank 200. Optionally, the first sections 400 and/or the second section 410 include various small-angle bends therealong for rendering the assembly 190 more compact and/or easier to install through the aperture or hole in the tank 200.

During installation, the second section 410 is offered through the aperture or hole in the tank 200, and thereafter the assembly 190 is rotated by substantially 90° so that first sections 400 can then pass through the aperture or hole until the head arrangement 290 finally engages onto the aperture or hole in the tank 200. Thereafter, the assembly 190 is then secure to the tank 200, for example by way of screws and/or ring fasteners and/or clips. Such a series of steps are performed in reverse when the assembly 190 is to be removed from the tank 200, for example for replacement, cleaning or repair.

Figure 4:
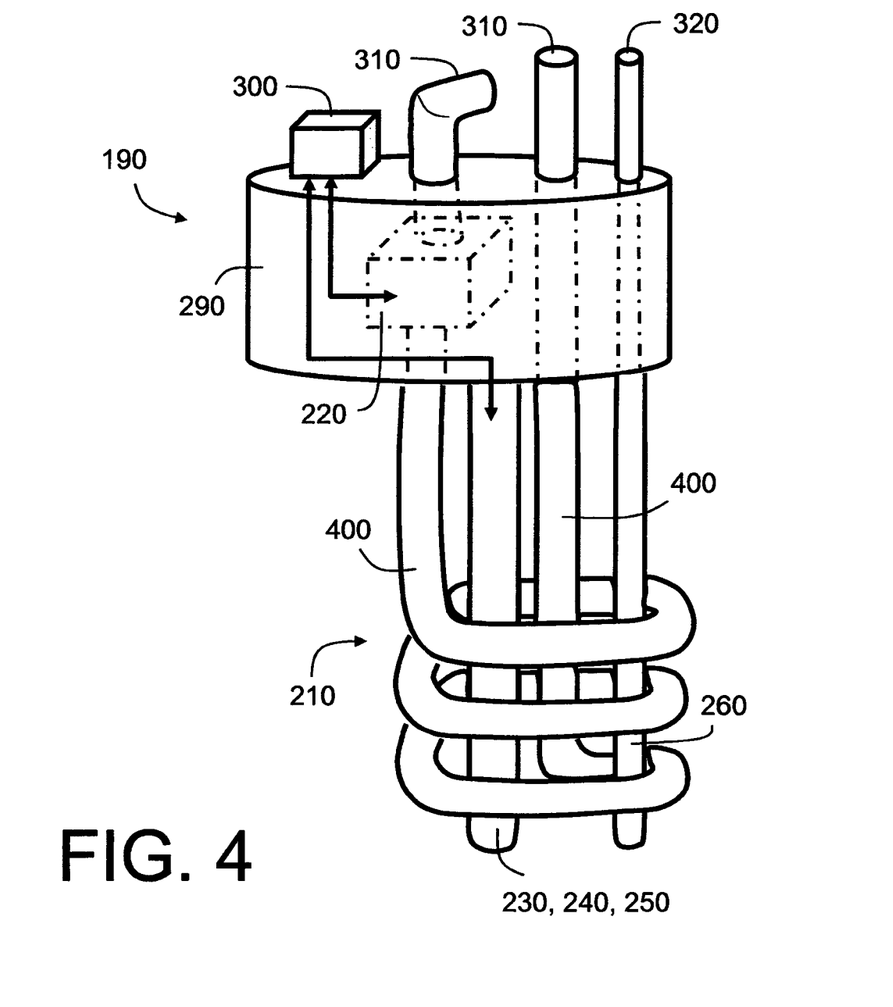
FIG. 4 is a schematic illustration of a second embodiment of a heater assembly pursuant to the present invention for utilizing in the exhaust system of FIG. 2.

Optionally, the heating element 210 is implemented in a compact spiral form as illustrated in FIG. 4. Beneficially, the heating element 210 includes in a range of 5 to 20 spiral turns; substantially two such turns are illustrated in FIG. 4. Beneficially, the turns of the heating element 210 are distributed along the length of the assembly 190 and not merely concentrated at its lower end remote from the head arrangement 290. The spiral turns of the heating element 210 beneficially have an external diameter which is less than a diameter of the aperture or hole of the tank 200 through which the assembly 190 is designed to be mounted in operation. The heating element 210 is beneficially adapted to receive coolant water from a cooling arrangement of the engine 110 as described earlier.

Alternatively, the heating element 210 is implemented as a folded construction wherein the element 210 is folded back onto itself in a meandering zig-zag manner. Yet alternatively, the heating element 210 includes a complex configuration including both curved and straight sections of element.

The assembly 190 is beneficially fabricated from acid-proof steel, stainless steel or similar metal alloys in combination with injection-moulded plastics materials components. Output from the sensors 230, 240, 250 are optionally provided via CanBus as conventionally employed for automotive systems. Moreover, the valve 220 is optionally implemented with integral drive electronic components. Furthermore, the valve 220 is susceptible to being implemented as a needle valve, a rotary valve, a displaceable slider valve, a diaphragm valve, a stacked piezo-electric element valve to mention a few alternative implementations for the valve 220.

It is advantageous from several perspectives to have the valve 220 integrated into the assembly 190 rather than having it mounted separately at other locations on vehicles. Cost savings are thereby obtained as well as rendering installation simpler and faster by avoiding a need to couple more tubes. Thus, the assembly 190 is capable of providing advantages including one or more of:

(a) on-chassis vehicle mounting of the assembly 190 is greatly simplified on account of the valve 220 being integrated into the head arrangement 290;

(b) no extra hook-up operation of cabling and tubing is required during installation on account of the valve 220 being integrated with the sensors 230, 240, 250;

(c) a coolant water loop and associated connections between the sensors 230, 240, 250 and the valve 220 are eliminated from an external point of view;

(d) consumption of connectors and tubing materials during manufacturing of the assembly 190 is reduced;

(e) no extra electrical cabling or coolant water piping or tubing needs to be routed to a separately installed valve located elsewhere on a chassis of a vehicle; and (f) general material savings and weight reduction can be achieved, thereby reducing overall vehicle weight.

Embodiments of the present invention are capable of providing several benefits in additional to their functionality of providing AdBlue in a more reliable manner, thereby reducing pollution and health damage caused by potentially harmful vehicle emissions.

Modifications to embodiments of the invention described in the foregoing are possible without departing from the scope of the invention as defined by the accompanying claims.

Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

Numerals included within parentheses in the accompanying claims are intended to assist understanding of the claims and should not be construed in any way to limit subject matter claimed by these claims.

The invention claimed is:

1. An assembly comprising:
   a tank for containing a supply of solution for delivery to an exhaust system of an internal combustion engine, said tank having an access opening in an upper end thereof; and
   a heater assembly for warming the solution in said tank, said heater assembly having
      a head arrangement removably mounted in said access opening in said upper end of said tank,
      a tubular heating element extending from said head arrangement into said tank for circulating a heated medium therethrough and being connectable to a coolant system of the internal combustion engine for receiving heated medium therefrom,
      a valve housed within said head arrangement for controlling the flow of heated medium through said heating element,
      a temperature sensor extending from said head arrangement into said tank for measuring a temperature of the solution within said tank;
      a depth sensor extending from said head arrangement into said tank for measuring the depth of the solution within said tank; and
      a concentration sensor extending from said head arrangement into said tank for measuring the concentration of urea in an aqueous urea solution within said tank based upon measuring differential ultrasonic radiation propagation within the aqueous solution within said tank, said heating element, said valve, said temperature sensor, said depth sensor, and said concentration sensor being spatially distributed in said head arrangement, and an engine control module electronically connected to said valve, said depth sensor, said temperature sensor and said concentration sensor for controlling said valve to maintain the urea solution in said tank in a predetermined state wherein said valve hinders circulation of the heated medium through said heating element in response to a temperature of the solution in said tank being above a predetermined level and said valve increases circulation of the heated medium through said heating element in response to the urea concentration in the solution in said tank being below a predetermined level.

2. The assembly as set forth in claim 1 where said heating element is of L-shaped configuration including two first sections disposed perpendicularly of said head arrangement and a second section parallel to said head arrangement.

3. The assembly as set forth in claim 1 where said heating element is of spiral form.

4. An assembly comprising:
a tank for containing a supply of solution for delivery to an exhaust system of an internal combustion engine,
a heater assembly for warming the supply of solution in said tank, said heater assembly having a head arrangement for removable mounting on an upper end of said tank, a tubular heating element extending from said head arrangement for immersion in the tank for circulating a heated medium therethrough and being connectable to a coolant system of the internal combustion engine for receiving heated medium therefrom, a valve housed within said head arrangement for controlling the flow of heated medium through said heating element, a temperature sensor extending from said head arrangement for positioning within said tank for measuring a temperature of a solution within said tank; a depth sensor extending from said head arrangement into said tank for measuring the depth of the solution within said tank; and a concentration sensor extending from said head arrangement into said tank for measuring the concentration of urea in an aqueous urea solution within said tank based upon measuring differential ultrasonic radiation propagation within the aqueous solution within said tank; and
an engine control module electronically connected to said valve, said temperature sensor and said concentration sensor for controlling said valve to maintain the urea solution in said tank in a predetermined state wherein said valve hinders circulation of the heated medium through said heating element in response to said temperature sensor sensing a temperature of the solution in said tank being above a predetermined level and said valve increases circulation of the heated medium through said heating element in response to said concentration sensor sensing the urea concentration in the solution in said tank being below a predetermined level.

5. A vehicle comprising:
a combustion engine for propelling the vehicle, said engine having an exhaust system for handling exhaust gases generated in said engine;
a tank for containing a urea solution for delivery to said exhaust system, said tank having an access opening in an upper end thereof;
a heater assembly for warming the solution in said tank, said heater assembly having a head arrangement removably mounted on said upper end of said tank, a tubular heating element extending from said head arrangement into said tank for circulating a heated medium therethrough and being connectable to a coolant system of the internal combustion engine for receiving heated medium therefrom, a valve housed within said head arrangement for controlling the flow of heated medium through said heating element, a temperature sensor extending from said head arrangement into said tank for measuring a temperature of the solution within said tank and a concentration sensor extending from said head arrangement into said tank for measuring the concentration of urea in an aqueous urea solution within said tank based upon measuring differential ultrasonic radiation propagation within the aqueous solution within said tank;
an engine control module electronically connected to said valve, said temperature sensor and said concentration sensor for regulating said valve to hinder circulation of the heated medium through said heating element in response to a temperature of the solution in said tank being above a predetermined level and to increase circulation of the heated medium through said heating element in response to the urea concentration in the solution in said tank being below a predetermined level.

6. A vehicle as set forth in claim 5 further comprising a depth sensor extending from said head arrangement into said tank for measuring the depth of the solution within said tank and electronically connected to said engine control module to provide a warning in response to the solution in said tank being below a predetermined depth.

* * * * *